H. A. LAURENCE.
SAP SPOUTS.

No. 182,122.        Patented Sept. 12, 1876.

WITNESSES:
H. Rydquist
John Goethals

INVENTOR:
H. A. Laurence
BY
ATTORNEYS.

UNITED STATES PATENT OFFICE.

HIRAM A. LAURENCE, OF WEST SHEFFORD, QUEBEC, CANADA.

IMPROVEMENT IN SAP-SPOUTS.

Specification forming part of Letters Patent No. 182,122, dated September 12, 1876; application filed June 6, 1876.

*To all whom it may concern:*

Figure 1:
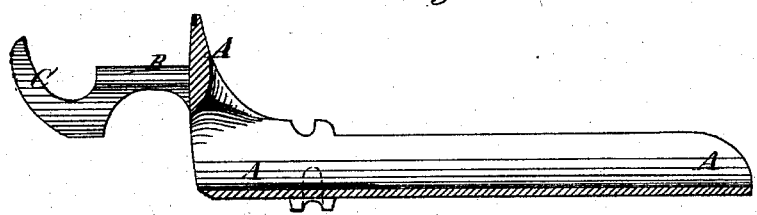
Figure 2:
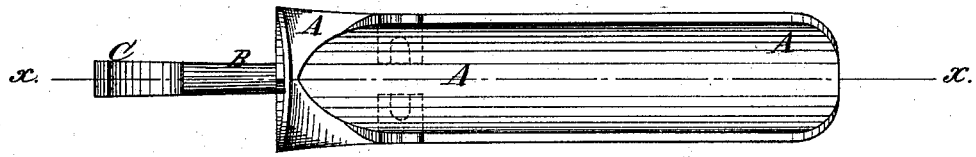

Be it known that I, HIRAM A. LAURENCE, of West Shefford, in the county of Shefford, Province of Quebec and Dominion of Canada, have invented a new and useful Improvement in Sap-Spout, of which the following is a specification:

Figure 1 is a longitudinal section of my improved sap-spout, taken through the line *x x*, Fig. 2. Fig. 2 is a top view of the same.

Similar letters of reference indicate corresponding parts.

The object of this invention is to furnish an iron sap-spout that may be applied to the tree without pounding, and, consequently, without injuring the bark, which will prevent leakage, cannot be forced out by the sap freezing in the hole, and which cannot be drawn out or loosened by suspending a bucket from it.

The invention consists in an iron sap-spout, provided with a stem upon the upper part of its base, having a hook with a transversely-edged point, and a longitudinally-edged back formed upon its end, and provided with an edge around the lower part and sides of its base, as hereinafter fully described.

A is the body of the spout, which is made in the form of a half-tube. At the base the sides of the spout are extended up to meet above the cavity, and at the lower part and sides is drawn to an edge. Upon the upper part of the base is formed a stem, B, the outer part of which has a hook, C, formed upon it, the end of which has a transverse edge formed upon it. The lower part of the hook C has a cam-shaped longitudinal edge formed upon it.

The hole in the tree is made of such a size that the stem B C can be inserted in it by raising the outer end of the spout. When the stem has been pushed so far into the hole that the upper part of the base of the spout strikes against the bark of the tree, the outer end of the spout A is then pressed downward, which forces the transverse edge of the end of the hook C into the upper part of the hole in the tree, and the longitudinal edge of the base of the hook C into the lower part of the hole in the tree. At the same time, the edge upon the base is forced into the bark of the tree around the lower part and sides of the hole, so that there can be no leakage.

Having thus described my invention, I claim as new and desire to secure by Letters Patent—

A sap-spout having an edge around the lower part and sides of its base, and provided with a stem, B, having hook C, with a transverse upper edge and a longitudinal lower edge, substantially as herein shown and described.

HIRAM A. LAURENCE.

Witnesses:
J. S. KEEP,
M. A. KEEP.